United States Patent [19]
Dadel et al.

[11] Patent Number: 5,119,914
[45] Date of Patent: Jun. 9, 1992

[54] ACCUMULATOR AND RELAY VALVE

[75] Inventors: Martin R. Dadel, Plainfield; Charles F. Long, Indianapolis; Phillip F. McCauley, Zionsville; J. Curt Vapor, Plainfield; Dennis M. Cooke, Danville, all of Ind.

[73] Assignee: General Motors Corporation, Detroit, Mich.

[21] Appl. No.: 776,013

[22] Filed: Oct. 15, 1991

[51] Int. Cl.⁵ ............................................. F16D 25/14
[52] U.S. Cl. .............................. 192/85 R; 192/109 F
[58] Field of Search ................... 192/85 R, 109 F; 91/419; 251/51; 60/435

[56] References Cited

U.S. PATENT DOCUMENTS

| | | | |
|---|---|---|---|
| 3,348,643 | 10/1967 | Townsend | 192/109 F X |
| 3,985,063 | 10/1976 | Lemon | 192/109 F X |
| 4,046,162 | 9/1977 | Rodeghiero | 192/109 F X |
| 4,930,080 | 5/1990 | Suzuki | 192/109 F X |

*Primary Examiner*—Rodney H. Bonck
*Attorney, Agent, or Firm*—Donald F. Scherer

[57] ABSTRACT

An accumulator and relay valve is operable to isolate a fluid operated electric switch from the transient pressure pulses present at the output of a pulse-width-modulated pressure control valve. The accumulator and relay valve is further operable to control a minimum pressure level that is communicated from the pressure control valve to the switch.

6 Claims, 1 Drawing Sheet

ACCUMULATOR AND RELAY VALVE

BACKGROUND OF THE INVENTION

This invention relates to hydraulic control mechanisms, and more particularly, to such control mechanisms including a pulse-width-modulated valve and an electrical switch. Specifically, this invention relates to control mechanisms for isolating the pressure oscillations of a pulse-width-modulated valve from the switch.

Electronic controls are being utilized in many power transmissions to control the actuation of fluid operated friction devices, such as clutches and brakes. In a number of the electronically controlled transmissions, the fluid pressure levels in the various fluid operated friction devices are controlled by pulse-width-modulated solenoid valves. These solenoid valves operate at a substantially constant A/C frequency in the range of 60 to 70 Hz. By changing the duty cycle by controlling the percentage of time that the solenoid is in the "on" state vs. the percentage of the time that the solenoid is in the "off" state, the apply pressure of the fluid operated devices can be modulated at any desired pressure level between zero and a maximum system pressure. These control systems have been found to be cost effective in controlling fluid operated friction devices, however, they do present a side effect of inducing high frequency noise or hydraulic pressure pulsations into the fluid circuit.

These control devices also utilize pressure operated electrical switches which provide various diagnostic and control functions. It is preferable to use a low cost pressure operated electrical switches. However, low cost switches do not have structural advantages which will prevent the pressure pulsations from acting on the switch. Thus, the switches undergo significantly more off/on signals than are necessary during normal transmission operation.

SUMMARY OF THE INVENTION

The present invention provides an accumulator and relay control mechanism for both reducing the magnitude of the pressure pulsations acting on the electrical switch and also establishing an accumulator for the on-coming fluid operated friction device. This is accomplished through the use of a valve which is installed in a hydraulic circuit in parallel flow relation with a pressure switch. The valve will act as a relay valve, such that when the friction device is disengaged, the pressure operated electrical switch is coupled to exhaust and when the friction device is engaged, the switch is connected to the apply pressure.

During application of the friction device, the pressure operated switch will remain connected to exhaust until the apply pressure is increased above the switch opening pressure setting. At the higher the pressure levels, the switch is subjected to the output pressure of a pulse-width-modulated valve through an accumulator chamber and a control passage which greatly reduces the magnitude of the pressure pulsations.

During the transition of connecting the electrical switch from exhaust to high pressure, a spool valve in the accumulator and relay control mechanism provides a control zone, wherein the switch is connected to both the pressure output from the pulse-width-modulated valve and to exhaust through a highly restricted passage provided by the diametral clearance of the valve spool in the valve bore.

The use of the present invention has been found to be effective in reducing the number of state changes or on/off signals of the pressure switch from approximately 8500 per hour to 200 per hour during a typical driving schedule. Due to the reduction of on/off signals, the overall life span of the electrical pressure switch is improved and the switch function can be provided with a low cost component.

It is therefore an object of this invention to provide an improved accumulator and relay valve in combination with a transmission control system, wherein an electrical switch is operatively connected with the valve which provides protection from pressure pulsations within a hydraulic control circuit.

It is another object of this invention to provide an accumulator and relay valve in a fluid operated friction device apply circuit, wherein a pulse-width-modulated valve is operable to provide engagement pressure and a pressure operated electrical switch is operative to provide an indication of the presence of engagement pressure, and further wherein the electrical switch is effectively isolated from the apply pressure prior to a minimum pressure value being established, and also wherein the pressure pulsations generated at the pulse-width-modulated valve are greatly reduced prior to being introduced to the electrical switch.

These and other objects and advantages of the present invention will be more apparent from the following specification and drawings.

DESCRIPTION OF AN EXEMPLARY EMBODIMENT

Figure 1:
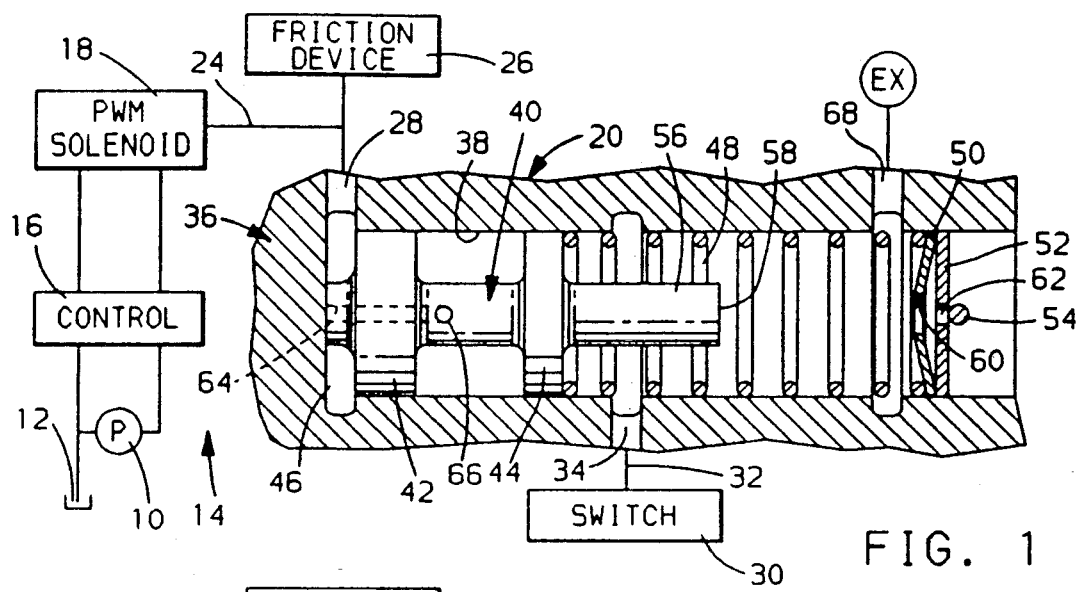
FIG. 1 is a diagrammatic representation of a fluid operated system incorporating an accumulator and relay valve.

Referring to the drawings, wherein like characters represent the same or corresponding parts throughout the several views, there is seen in FIG. 1 a diagrammatic representation of a hydraulic control system including a pump 10 which draws fluid from a reservoir 12 for delivery to a conventional power transmission control system 14, which incorporates a plurality of control valves and elements 16, a pulse-width-modulated solenoid valve 18 and an accumulator and relay valve 20.

The control 14 can, of course, incorporate a number of pulse-width-modulated solenoids and other accumulator and relay valves similar to valve 20. The solenoid valve 18 is selectively operable to provide an output pressure in a passage 24 which is delivered to a conventional fluid operated friction device 26 and an accumulator port 28 incorporated in the valve 20. The fluid operated friction device 26 is a conventional multi-disc arrangement which has a conventional fluid operated piston, not shown, selectively pressurized by pressure in passage 24 to control the engagement and disengagement of conventional disc members, not shown, to thereby control the establishment of the torque transmission path. The friction device 26 may be either a clutch or a brake.

As is well known, the solenoid valve 18 is controlled electronically, generally by a conventional microprocessor, which can be incorporated into the control 14, to cause rapid opening and closing of a pressure port to alternately connect the passage 24 between a pressure passage and an exhaust passage. By controlling the duty cycle of the solenoid valve 18, the pressure within the passage 24 is controlled. As the "on" time of the solenoid increases as a percentage of the total duty cycle, the pressure in passage 24 increases. This type of pressure control function is well known. Due to the rapid opening and closing of the solenoid valve 18, pressure pulsations are introduced into the passage 24. These pulsations are often termed "noise".

The friction device 26, as previously mentioned, incorporates a piston member which has associated therewith an apply chamber which is sufficiently large to dampen pulsations such that the piston does not respond to the pressure pulsations. It is desirable, generally for diagnostic purposes, to employ an electrical switch which is actuated when the friction device 26 is operated. With the present invention, a switch 30 is provided. The switch 30 is a conventional fluid pressure operated electrical switch having a fluid connection or pressure passage 32 which is connected to a switch port 34 of the valve 20.

The valve 20 includes a valve body 36 in which is formed a valve bore 38. A valve spool 40, having a pair of spaced valve lands 42 and 44, is slidably disposed in the valve bore 38. The valve land 42 cooperates with the valve bore 38 to form an accumulator chamber 46 which is in fluid communication with the accumulator port 28.

The valve 20 also includes a spring 48 which is compressed between the valve land 44 and a washer spring 50 which in turn is maintained in the valve bore 38 by a spring seat 52 and a pin 54. The valve spool 40 has an extension 56 which extends from the valve land 44 toward the washer spring 50. The extension 56 has a substantially circular end portion 58 which is aligned with and slightly larger than a circular opening or aperture 60 formed in the washer spring 50.

The spring seat 52 has a central opening or restriction 62 which is aligned with the aperture 60. The function of these components will be discussed later. The valve spool 40 has a longitudinal passage 64 and a restricted radial passage 66. The longitudinal passage 64 extends from one side of valve land 42 to a location between the valve lands 42 and 44 where it is intersected by the passage 66.

In the "at rest" or spring set position shown, the valve land 44 is operable to close the switch port 34 to the space between the valve lands 42 and 44 and to permit fluid communication between the switch port 34 and an exhaust port 68. The valve spool 40 is maintained in this position until the fluid pressure in passage 24, and therefore in accumulator chamber 46, is sufficient to overcome the force in the spring 48. When the pressure level in the accumulator chamber 46 reaches a predetermined value, the valve spool 40 will begin to move rightward, as seen in the drawings, against the spring 48.

Figure 2:
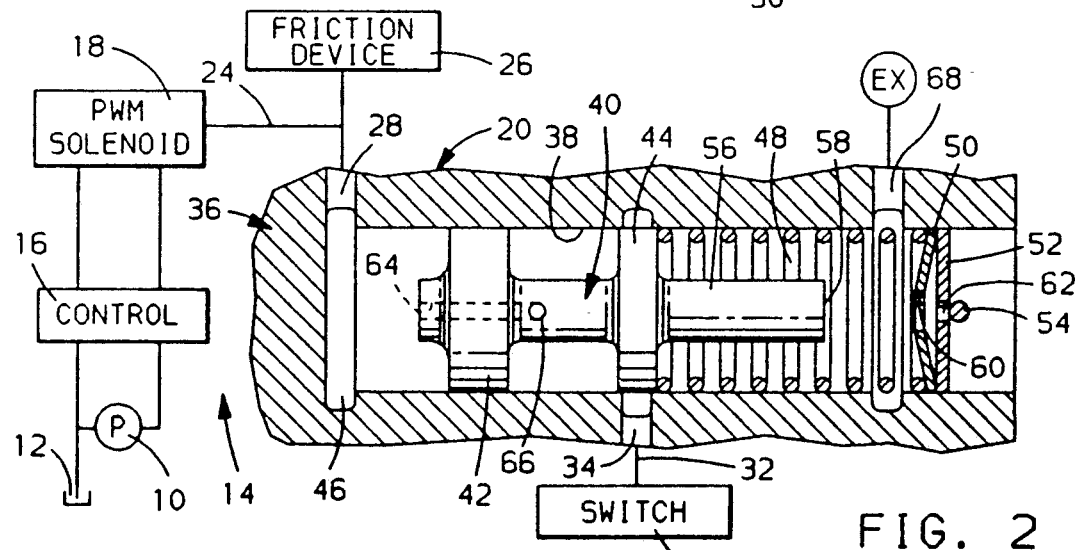
FIG. 2 is a diagrammatic view similar to FIG. 1 with a portion of the accumulator and relay valve shown in an operating mode.

As the fluid pressure in the accumulator chamber 46 continues to increase, the valve spool 40 will continue to move until the position shown in FIG. 2 is reached. At this location, it is seen that the valve land 44, which is slightly wider than the switch port 34, is covering the switch port 34. Due to the diametral clearance between the valve bore 38 and the valve land 44, controlled communication between the fluid admitted at the restricted passage 66, the switch port 34 and the exhaust port 68 is provided. This will permit a slow or controlled buildup of pressure at the switch port 34 and therefore in the pressure passage 32.

Figure 3:
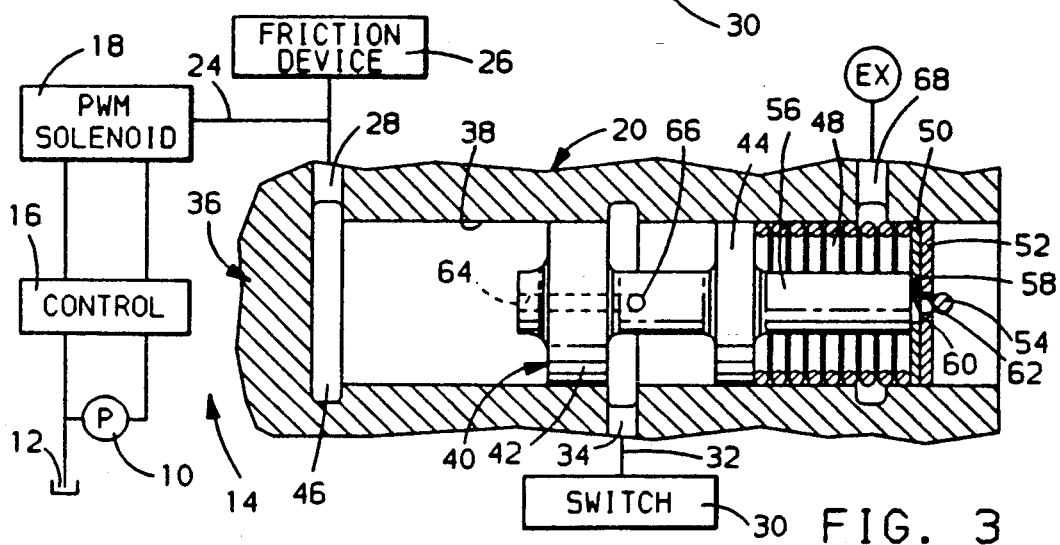
FIG. 3 is a view also similar to FIG. 1 showing the accumulator and relay valve in yet another operating mode.

As the fluid pressure in the accumulator chamber 46 continues to increase, the valve spool 40 will move to the position shown in FIG. 3. In this position, the switch 30 is subjected to the maximum pressure found in the accumulator chamber 46. However, due to the volume of the accumulator chamber 46 and the restricted passage 66, the noise introduced by the solenoid valve 18 is substantially isolated from the pressure switch.

It should be noted at this point, that the spring 48 is designed to have characteristics which will prevent the valve spool 40 from reaching the position shown in FIG. 2, prior to the pressure level in the chamber 46 being greater than the switch opening pressure required in passage 32 to actuate the switch 30. Thus, once the valve land 44 has established full communication between the fluid pressure at passage 66 and the switch port 34, the pressure switch will open and will remain open because the pressure pulsations or noise will not be sufficient to permit the pressure level to decrease below the level required to activate the switch 30.

In some control systems, the valve spool 40 may have substantial momentum as the end of the stroke, as represented by FIG. 3, is approached. The washer spring 50 is provided to absorb much of this momentum and to dampen any energy vibrations that may occur, as the end of the stroke is approached. The washer spring 50 will be abutted by the end portion 58 of extension 56 and will be deflected from the position in FIG. 2 to that shown in FIG. 3.

Along with providing mechanical damping, some hydraulic damping can also be provided by the restriction 62. As the end portion 58 abuts the washer spring 50, it will close the opening 60 thereby preventing any fluid trapped between the washer spring 60 and spring seat 52 from flowing to the exhaust port 68. As the washer spring 50 is deflected, the fluid found therein will be forced to pass through the restriction 62 which is aided by the position of pin 54. This will provide some fluid damping along with the mechanical spring damping. When the friction device 26 is disengaged by the exhausting of pressure in the passage 24, the valve spool 40 will return to the position shown in FIG. 1 in preparation for the next apply signal of the friction device 26.

It should be appreciated that the switch 30 will be actuated only once during the apply signal of the friction device 26. In prior art devices where the switch 30 is not isolated, a considerable number of switch signals occur during each application signal of the friction device due to the pressure oscillations. The present invention will therefore greatly increase the life span of the switch 30 and significantly reduce the cost required to produce the switch.

The embodiments of the invention in which an exclusive property or privilege is claimed are defined as follows:

1. An accumulator and relay control valve in a transmission hydraulic control circuit including a pulse-width-modulated solenoid, a fluid operated friction device and a pressure responsive electrical switch having a closing pressure level, said valve comprising: a valve bore having a switch port of predetermined opening, an exhaust port and an accumulator port; a valve spool slidably disposed in said valve bore, including a pair of spaced lands, one of which cooperates with said valve bore to provide an accumulator portion variable between a minimum volume and a maximum volume, and the other of which separates the accumulator portion from the exhaust port, said other land having a predetermined width which is greater than the predetermined opening of the switch port, such that an overlap condition providing controlled pressurization of the switch port will exist during a portion of a valve stroke within the bore; a spring member urging said valve spool within said bore to reduce the volume of said accumulator portion and to connect said switch port to said exhaust port, the accumulator port being in fluid communication with said pulse-width-modulated solenoid and said fluid operated friction device, such that fluid pressure generated therein will act on said first land to move said valve spool against said spring to increase the volume of said accumulator portion and thereby control the engagement of said fluid operated friction device and dampen pressure pulsations generated at said pulse-width-modulated solenoid valve; a restricted passage formed in said valve spool for communicating fluid pressure at said pulse-width-modulated solenoid to said switch port at a predetermined pressure level in said friction device; and a washer spring disposed adjacent one end of said valve bore and being in contact with one end of said spring while providing a cushion for said valve spool when said accumulator portion is within a predetermined volume range.

2. The valve defined in claim 1, wherein said spring member has sufficient characteristics to prevent the other valve land from opening the switch port to fluid pressure between said lands prior to a pressure level in the accumulator portion being greater than said closing pressure level.

3. The valve defined in claim 1 further including a damping chamber means adjacent said washer spring for cooperation with said valve spool for providing controlled deflection of said washer spring.

4. The valve defined in claim 2 further including a damping chamber means adjacent said washer spring for cooperation with said valve spool for providing controlled deflection of said washer spring.

5. An accumulator and relay valve in a transmission hydraulic control circuit including a pulse-width-modulated solenoid providing a pressure signal having pressure pulsations therein, a fluid operated friction device and a pressure responsive electrical switch having a closing pressure level, said valve comprising: a valve bore having a switch port of predetermined opening, an exhaust port and an accumulator port; a valve spool slidably disposed in said valve bore, including a pair of spaced lands, one of which cooperates with said valve bore to provide an accumulator portion variable between a minimum volume and a maximum volume, and the other of which separates the accumulator portion from the exhaust port, said other land having a predetermined width which is greater than the predetermined opening of the switch port, such that an overlap condition will exist during a portion of a valve stroke within the bore; a spring member urging said valve spool within said bore to reduce the volume of said accumulator portion and to connect said switch port to said exhaust port, the accumulator port being in fluid communication with said pulse-width-modulated solenoid and said fluid operated friction device, such that fluid pressure generated therein will act on said first land to move said valve spool against said spring to increase the volume of said accumulator portion and thereby damping a portion of the pressure pulsations in the pressure signal of said pulse-width-modulated solenoid valve; and a restricted passage formed in said valve spool for communicating fluid pressure at said pulse-width-modulated solenoid to said switch port at a predetermined pressure level in said friction device.

6. The valve defined in claim 5, wherein said spring member has sufficient characteristics to prevent the other valve land from opening the switch port to fluid pressure between said lands prior to a pressure level in the accumulator portion being greater than said closing pressure level.

* * * * *